United States Patent Office 3,537,163
Patented Nov. 3, 1970

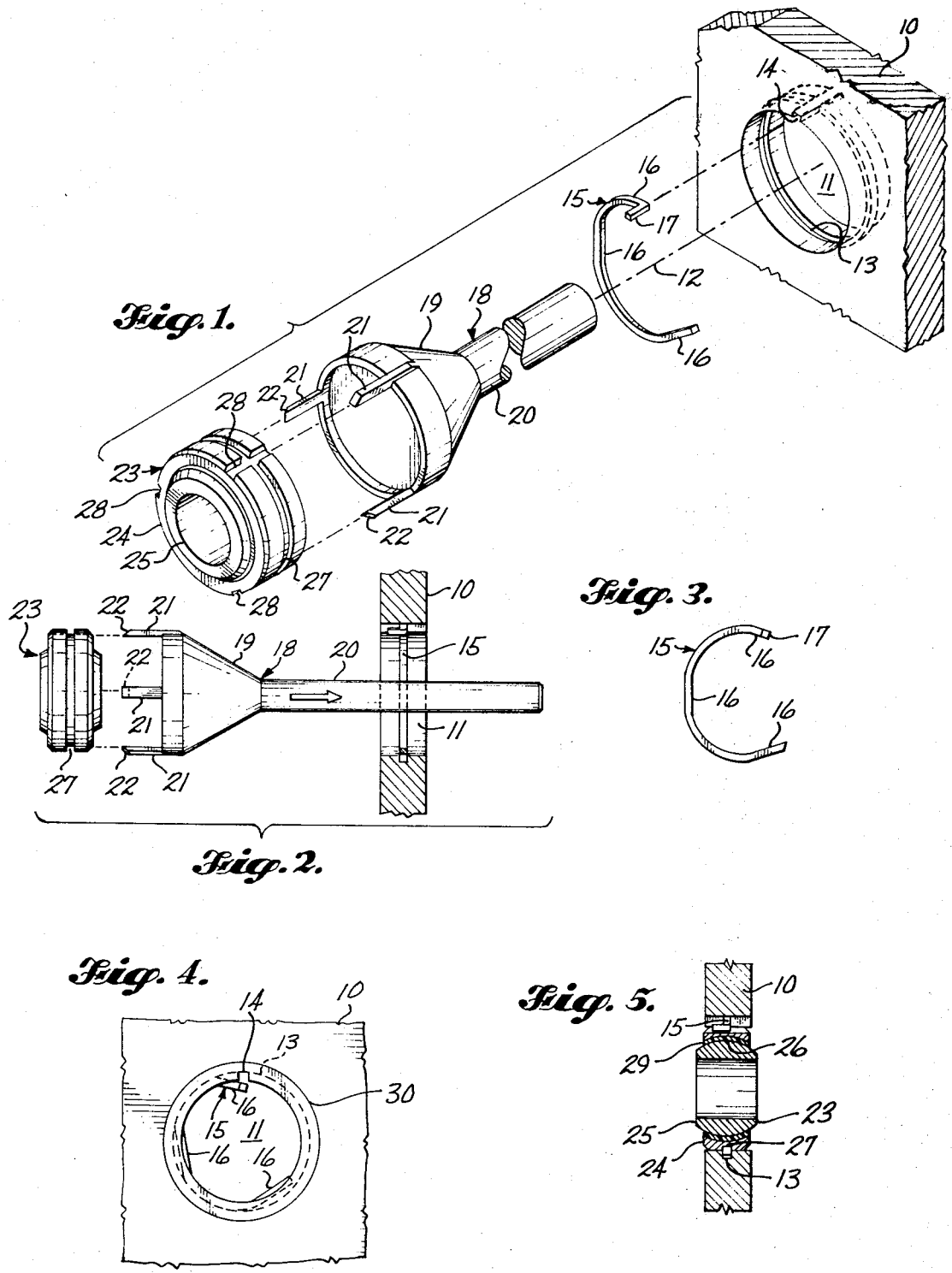

3,537,163
METHOD OF INSTALLING A CYLINDRICAL
ELEMENT INTO A CYLINDRICAL BORE
Robert H. Steidl, 17030 15th St. NW.,
Seattle, Wash. 98177
Continuation-in-part of application Ser. No. 437,115,
Mar. 4, 1965. This application Apr. 30, 1968, Ser.
No. 725,355
Int. Cl. B23p 11/00
U.S. Cl. 29—149.5                                    7 Claims

ABSTRACT OF THE DISCLOSURE

Method for assembling a cylindrical element, such as but not limited to a bearing in a mounting structure bore, for installing the element in a cylindrical bore, comprise the basic steps of (a) forming an external annular groove in the outer surface of the cylindrical element and an internal annular groove in the inner surface of the cylindrical bore for receiving a resilient retaining ring in the cylindrical bore, and (b) forming an external slot in the outer surface of the cylindrical element transverse to the annular groove for receiving a bent-out portion of the resilient ring for locking the element in the bore.

In the method for assembling the bearing into its mounting structure wherein the disclosed retaining ring has three straight portions comprises, a step comprising expanding the straight portions, such as but not limited to utilizing a beveled three prong tool.

Cross-references to related applications

This is a continuation-in-part of application Ser. No. 437,115, filed Mar. 4, 1965, now U.S. Pat. No. 3,382,015.

Field of the invention

This invention appears to be classified in class 29, subclass 149.5.

Summary of the invention

The instant application comprises methods for installing a cylindrical element in a cylindrical bore, such as but not limited to a bearing in a mounting structure, one embodiment for carrying out the method being disclosed and claimed in the above identified patent.

The disclosed method comprises, making a bearing, for example, by, (a) forming an external annular groove in the bearing outer surface for receiving a resilient ring in a bearing mounting structure, (b) forming an external slot in the bearing outer surface transverse to the external annular groove for receiving a bent-out portion of the resilient ring, (c) forming an annular groove in the internal surface of the bore corresponding with the bearing annular groove, (d) positioning a resilient ring in both said grooves, (e) forming a slot in the bore transverse to the bore annular groove, (f) positioning a bent-out portion of the resilient ring in both said transverse slots, and (g) forming straight portions in the ring for protruding into the annular grooves of both the bearing and the bore for locking the bearing in the bore.

In an increasing number of industries and in particular the aircraft industry, many applications require bearings. Most of these bearings are retained by friction or by various other methods such as swagging, staking, or bonding. However, these methods are troublesome, uneconomical, and inefficient, for instance, the staked bearing can only be pushed out for replacement and installation of the new bearing requires rework of the hole, new bushing etc. Swagging and bonding have similar drawbacks.

The present invention solves these problems of installing and removing of bearings in an unique way whereby the bearing mounting hole is not damaged and the bearing is locked radially and axially between the outer and inner race and the installation or removal takes only seconds.

Accordingly a primary object of this invention is to provide a new method for assembling a new bearing.

Another primary object of this invention is to provide a new method for installing a bearing in a mounting structure.

A further object of this invention is to provide a new method for retaining a bearing in a mounting structure.

A still further object of this invention is to provide a new method for assembling, installing, and retaining a cylindrical element in a cylindrical bore.

Other objects and various advantages of the disclosed method of assembling, installing, and retaining a cylindrical element in a cylindrical bore will be apparent from the following detailed description, together with the accompanying drawing, submitted for purposes of illustration only and not intended to define the scope of the invention, reference being made for that purpose to the subjoined claims.

Brief descriptions of figures

The drawing diagrammatically illustrates by way of example, not by way of limitation, a mechanism for manually carrying out the methods of the invention wherein like reference numerals designate corresponding parts in the several views in which:

FIG. 1 is an exploded schematic perspective view of a bearing being installed or removed by the disclosed method;

FIG. 2 is a schematic front view of a bearing being installed by the new method, parts in exploded view and parts cut away;

FIG. 3 is a schematic plan view of a retaining ring useable with the bearing in the disclosed method;

FIG. 4 is a schematic plan view of a modified bearing mounting hole with the retaining ring therein also for carrying out the disclosed method; and FIG. 5 is a schematic cross section of an installed bearing mounted by the disclosed method.

Description of the preferred methods

The invention, the scope of which being defined in the appended claims, is not limited in its application to the details of construction and arrangement of parts shown and described, since the invention is capable of other methods and embodiments and of being practiced or carried out in various other ways. Also it is to be understood that the phraseology or terminology employed herein is for the purpose of description and not of limitation.

A typical bearing that may be assembled, installed, and retained by the new methods is disclosed hereafter.

In general the bearing mounting structure comprises a bore with an annular internal groove and an aperture for preventing rotational movement of a retaining ring disposed in the internal groove. The bearing has an annular outer race which contains, for example, a spherically curved internal concave ball socket and this outer race has an outer surface which will fit the bore of the mounting structure. An annular external groove in the outer surface of the outer race will align with the internal groove of the bore of the mounting structure. A plurality of slots are spaced about the outer surface of the outer bearing's race or surface which are perpendicular and transverse with respect to the annular external groove. The resilient retaining ring is disposed in the external and internal grooves when these grooves are in aligned position to thus provide an interlocking relationship between the bearing and the mounting structure.

A tool having a plurality of tangs which are located in alignment with the slots about the external surface of the outer race is capable of holding the bearing and expanding the retaining ring while installing or removing the bearing in or from its mounting structure. It should be further noted that only the flat spots or straight portions on the retainer ring lock the bearing in place.

Referring now to the device wherein like reference characters designate corresponding parts throughout the figures, there is shown in FIG. 1 an exploded view in isometric fashion of the new method for assembling and installing a bearing and its additional components. A part of a mounting structure 10 is shown to have a bore 11, which bore has a longitudinal axis 12 as shown by the dot dash line and is provided with an annular internal groove 13. Perpendicular to this annular internal groove 13 is an internal transverse slot 14.

A retainer ring 15 having straight portions 16 and provided with a bent-out portion 17 is shown in alignment with the bore 11.

For carrying out the new method, an inserting tool as well as a removing tool 18 is shown with a chamfered shoulder 19 and a handle 20 in alignment with the center line of the bore 11. This tool 18 is provided with a plurality of tangs 21 having chamfered portions 22, for easy insertion into a typical bearing assembly 23. The shoulder 19 of tool 18 is specifically designed for gradually expanding the retainer ring 15 during installation procedure of the bearing assembly 23.

The bearing assembly 23 comprises two main parts, the first being the annular outer bearing or race 24, the second part being the inner ball member 25. The annular shaped outer bearing 24 has a central opening or ball socket 26 which is shaped inside as a ball socket.

The outer race 24, FIG. 1 is further provided with an annular external groove 27 and a plurality of external slots 28 transverse and perpendicular with the annular groove 27, there being a slot 42 in the outer race 24 and a tang 21 on the tool 18 for each flat spot 16 of the ring 15 as is explained hereinafter. Likewise, both slot 14 and slot 28 are parallel to the bore 11.

In FIG. 2 is shown the method of installing the bearing assembly 23 into the bearing mounting structure 10 by the assistance of the tool 18. The handle 20 of the tool 18 is shown to be inserted in the bore 11 and moved in the direction shown by the arrow. The bearing assembly 23 (shown detached from tangs 21) will be inserted and aligned with the tangs 21 and thus as a complete assembly moved towards the position required for mounting. FIG. 2 illustrates the mounting structure 10 as a cross section taken along its vertical center axis while the tool 18 with bearing assembly 23 are shown as a side view.

In FIG. 3 is shown the resilient retaining ring 15 in its free state. The C-shape of this ring 15 when installed in the annular internal groove 13 of the mounting structure will be somewhat compressed and its C-shape will be expanded when the bearing assembly 23 passes through during installation or removal, i.e., the flat spots 16 will be bent arcuate as the tool and bearing assembly are inserted into opening 11.

FIG. 4 shows a plan view of the mounting structure 10 and in dashed lines the outline of the annular internal groove 13 as well as the position taken by the retaining ring 15 when inserted therein. The bent-out portion 17 of the resilient retaining ring 15 is in alignment with the internal transverse slot 14, and when the bearing is inserted in bore 11, one of the bearing transverse slots 28 aligns with or corresponds with transverse groove 14 of the bushing 30 and bent-out portion 15 is positioned in both slots 28 and 14 to lock both together.

FIG. 5 illustrates a crossection of the installed bearing assembly 23 along its vertical center axis. The inner ball member 25 is slidably positioned in the ball socket formed by the central opening or ball socket 26 of the annular outer bearing 24. The ball socket formed by the central opening 26 contains a bonded layer of bearing materials such as Teflon 29, or the like. The annular outer bearing or outer race 24 has its annular external groove 27 in alignment with the annular internal groove 13 of bearing mounting structure 10. The retaining ring 15 is shown positioned in the two aforementioned grooves 27 and 13, respectively. Furthermore the bent-out portion 17, FIG. 3, of the retaining ring 15 is shown to be positioned in transverse slot 14, FIG. 5, of the bearing mounting structure 10.

In FIG. 4 is shown a bushing 30 having the grooves 13 and slot 19 therein instead of being in the mounting structure 10.

The method of installing the bearing follows: Tool 18 is brought into alignment with the bore 11 which is provided with the internal groove 13 and a retaining ring 15 installed therein. Referring to FIGS. 1 and 2, tool 18, when pulled into the direction of the arrow as shown in FIG. 2, will open the retaining ring 15 and push its straight portions 16 into the internal annular groove 13 with the shoulders 19 and tangs 21 of the tool 18. The bearing assembly 23 which is inserted and aligned with the location of the tangs 21 with respect to tht external transverse slots 28, moves together with tool 18 into the bore 11 in the direction of the arrow, with tangs 21 aligned with slot 14. As shown in FIG. 4, the straight portions 16 of the retaining ring 15 which normally protrude out of the annular internal groove 13 are pushed into groove 13 by the chamfered shoulder 19, FIG. 1, and the tangs 21 of the tool 18. By continuing movement of the tool 18 through the bore 11 of the mounting structure 10, the annular internal groove 13 of the housing 10 will line up with the external groove 27 of the outer bearing 24.

As soon as the bearing external groove 27 is in alignment with the mounting structure annular internal groove 13, FIG. 1, the retaining ring 15 will then snap into its position shown in FIG. 4 and the tool is then removed from the bearing assembly by sliding out the tangs 21 from the transverse slots 28. The bearing assembly 23 is now firmly installed and retained by the action of the retaining ring 15 holding the bearing assembly 23 in the mounting structure 10. Specifically, the installation of the retaining ring 15 requires first, compression thereof so that it will pass through bore 11 and then allowed to expand, thus installing itself in groove 3. When inserting the bearing assembly 25, the retaining ring 17 is expanded first and thereafter allowed to return to its installed and relaxed position. The transverse groove 14 and one of the slots 28, which may be narrower than the others, if so desired for ease of operation, are in alignment with one another and kept in alignment by the bent-out portion 17 of the retaining ring 15, thus preventing rotation of the assembly 23 in the bore 11 of the mounting structure 10.

The tool 18 may be designed with a removable handle which permits usage of the tool in situations where space is limited and thus the method of installing as previously described may be difficult to perform. The tool 18 without handle thus can be inserted from the back side of the bore 11 while the handle may be attached, from the front side, through the bore 11, to the tool head and the installation proceeds as described before.

While only a few methods of the invention have been shown in the accompanying specification and drawings, it will be evident that various other methods are possible in the disclosed method of assembling, installing, and retaining a cylindrical element from a cylindrical bore without departing from the scope of the invention, and it is accordingly desired to comprehend within the purview of this invention such methods as may be considered to fall within the scope of the appended claims.

I claim:

1. A method for fixedly installing a bearing having an external annular groove into a mounting structure bore having an internal annular groove and retaining ring therein comprising the steps of,
    (a) inserting the bearing between a plurality of parallel tangs on a tapered tool,
    (b) inserting said tool in said bore and expanding said retaining ring with said tangs and tapered tool until said bearing external groove is in alignment with said bore groove and retaining ring, and
    (c) removing said tangs to allow said retaining ring to contract into said bearing external groove.

2. A method as recited in claim 1 comprising the additional steps of,
    (a) forming a slot on said bearing transverse to said bearing external annular groove and a corresponding slot in said bore transverse to said bore internal annular groove, and
    (b) positioning a bent-out portion of said retaining ring in both said transverse slots.

3. A method as recited in claim 1 comprising the additional steps of,
    (a) forming a straight portion in the resilient ring,
    (b) spreading the ring straight portion with the tapered tool, and
    (c) removing the tool when the two annular grooves are aligned so that the ring straight portion protrudes into the annular grooves of both the bearing and the bore for locking the bearing in the bore.

4. A method for fixedly installing a bearing having an external annular groove into a mounting structure bore having an internal annular groove and retaining ring therein comprising the steps of
    (a) expanding the retaining ring into the internal annular groove of the bore,
    (b) inserting the bearing in the bore until the bearing external groove is in alignment with the bore groove and retaining ring, and
    (c) releasing the retaining ring to allow it to contract at least partially into the bearing external groove.

5. A method as recited in claim 4 comprising the further steps of,
    (a) forming a slot on the bearing transverse to said bearing external annular groove and a corresponding slot in the bore transverse to the bore internal annular groove, and
    (b) positioning a bent-out portion of the retaining ring in both the transverse slots.

6. A method as recited in claim 4 comprising the further steps of,
    (a) forming a straight portion in the resilient ring,
    (b) spreading the ring straight portion internally of the internal groove of the bore,
    (c) releasing the ring straight portion when the external groove is concentric with the internal groove to allow the ring straight portion to protrude at least partially into both grooves to lock the bearing in the groove.

7. A method for fixedly installing an element having an external annular groove into a bore having an internal annular groove and retaining ring therein comprising the steps of,
    (a) expanding the retaining ring into the internal annular groove of the bore,
    (b) inserting the element in the bore until the element external groove is in alignment with the bore groove and retaining ring, and
    (c) releasing the retaining ring to allow it to contract at least partially into the element external groove.

References Cited

UNITED STATES PATENTS

| | | | |
|---|---|---|---|
| 2,760,258 | 8/1956 | Reiger | 29—229 |
| 2,897,022 | 7/1959 | Marola | 308—208 |
| 2,923,580 | 2/1960 | Dwyer | 29—149.5 X |
| 2,987,349 | 6/1961 | Kretzmer | 308—72 |
| 3,326,580 | 6/1967 | Munier et al. | 29—453 X |
| 3,382,015 | 5/1968 | Steidl | 308—22 |

THOMAS H. EAGER, Primary Examiner

U.S. Cl. X.R.

29—441